(12) United States Patent
Dykstra et al.

(10) Patent No.: US 7,356,427 B2
(45) Date of Patent: Apr. 8, 2008

(54) METHODS AND SYSTEMS FOR ESTIMATING A NOMINAL HEIGHT OR QUANTITY OF A FLUID IN A MIXING TANK WHILE REDUCING NOISE

(75) Inventors: Jason Dykstra, Duncan, OK (US); Justin Borgstadt, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 153 days.

(21) Appl. No.: 11/029,072

(22) Filed: Jan. 4, 2005

(65) Prior Publication Data

US 2006/0161358 A1    Jul. 20, 2006

(51) Int. Cl.
G05D 9/00    (2006.01)
(52) U.S. Cl. .................. 702/100; 702/50; 73/1.73; 73/291; 700/281; 700/282
(58) Field of Classification Search .............. 702/50, 702/52, 53, 54, 55, 100, 156; 73/1.73, 1.74, 73/149, 291; 700/281, 282, 285
See application file for complete search history.

(56) References Cited

U.S. PATENT DOCUMENTS 3,886,065 A * 5/1975 Kappe et al. ............... 210/620
3,933,041 A   1/1976 Hyer ........................... 73/290

(Continued)

OTHER PUBLICATIONS

Kanagasabapathy P et al. "Neural network with reinforcement learning for Adaptive Time-Optimal Control of Tank Level" Advances in Modeling and Analysis B: Signals Information, Patterns, Data Acquisition, Transmission, Processing, Classification AMSE Press France, vol. 40, No. 1, 2000, pp. 17-47, XP009072551 ISSN 0761-2486.*

Patent application entitled "Control System Design for a Mixing System with Multiple Inputs" by Jason Dykstra, et al., filed May 3, 2005 as U.S. Appl. No. 11/121,278.

Patent application entitled Method for Servicing a Well Bore Using a Mixing Control System by Jason D. Dykstra, et al., filed May 3, 2005, as U.S. Appl. No. 11/121,325.

(Continued)

*Primary Examiner*—Manuel L. Barbee
(74) *Attorney, Agent, or Firm*—John W. Wustenberg; Baker Botts, L.L.P.

(57) ABSTRACT

Systems and methods are provided for estimating the height of a fluid contained in a mixing tank. A dynamic control device which operates as an external observer is used for controlling and monitoring the estimation. This estimate of the height is then compared to the measured fluid height in the mixing tank to obtain an estimation of the height error. The mixing tank has one or more input volumetric rates which are known along with the output volumetric rates. This height error is used to drive the estimation to the nominal height of the mixing tank through the use of a Proportional Integral PI type controller. By setting the PI gains, the noise and oscillations of the mixing tank can be removed from the height estimation while tracking the nominal value of the height. The methods and the systems can also be implemented for estimating the volume or quantity of fluid contained in a mixing tank. The methods and systems can also be implemented for a series of two mixing tanks divided in series where the fluid flows from the first tank to the second tank.

9 Claims, 7 Drawing Sheets

U.S. PATENT DOCUMENTS

| | | |
|---|---|---|
| 4,327,759 A | 5/1982 | Millis |
| 4,349,435 A * | 9/1982 | Ochiai .................. 210/96.1 |
| 4,421,716 A | 12/1983 | Hench et al. |
| 4,779,186 A | 10/1988 | Handke et al. |
| 5,027,267 A | 6/1991 | Pitts et al. |
| 5,038,611 A * | 8/1991 | Weldon et al. ............ 73/290 V |
| 5,098,667 A | 3/1992 | Young et al. |
| 5,281,023 A | 1/1994 | Cedillo et al. |
| 5,289,877 A | 3/1994 | Naegele et al. |
| 5,365,435 A | 11/1994 | Stephenson |
| 5,441,340 A | 8/1995 | Cedillo et al. |
| 5,570,743 A | 11/1996 | Padgett et al. |
| 5,571,281 A | 11/1996 | Allen |
| 5,624,182 A | 4/1997 | Dearing, Sr. et al. |
| 5,775,803 A | 7/1998 | Montgomery et al. |
| 6,007,227 A | 12/1999 | Carlson |
| 6,113,256 A | 9/2000 | Bonissone et al. |
| 6,120,172 A | 9/2000 | Chen et al. |
| 6,120,173 A | 9/2000 | Bonissone et al. |
| 6,253,607 B1 | 7/2001 | Dau |
| 6,491,421 B2 | 12/2002 | Rondeau et al. |
| 2003/0072208 A1 | 4/2003 | Rondeau et al. |

OTHER PUBLICATIONS

Foreign communcation related to a counterpart application dated Jul. 24, 2006.

Foreign communication related to a counterpart application dated Oct. 11, 2006.

"Neural Network with Reinforcement Learning for Adaptive Time-Optimal Control Tank Level" by P. Kanagasabapathy XP009072551.

"Experimental Validation of a Nonlinear Backstepping Liquid Level Controller for a State Coupled Two Tank System" by H. Pan, et al. XP009072551.

* cited by examiner

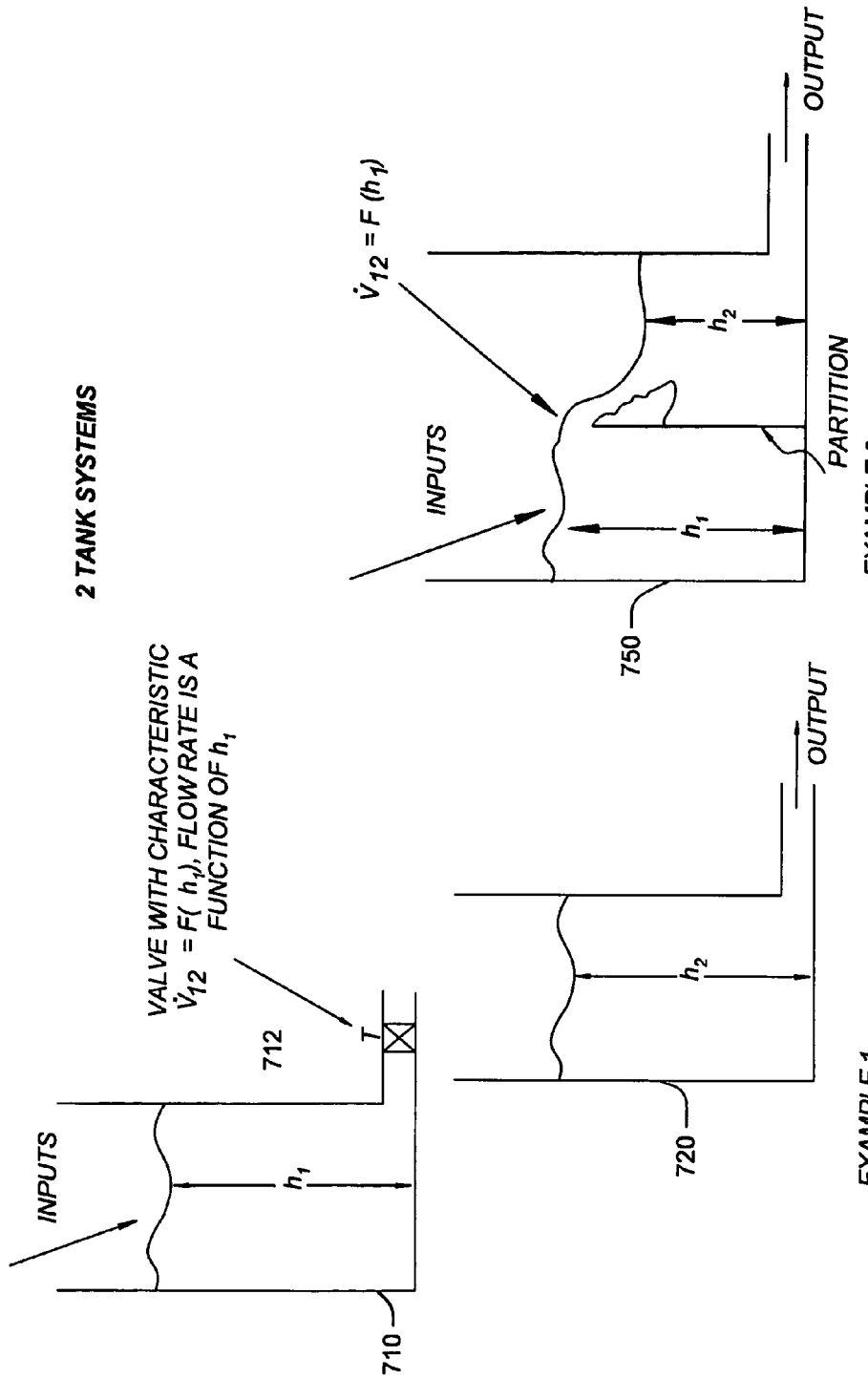

METHODS AND SYSTEMS FOR ESTIMATING A NOMINAL HEIGHT OR QUANTITY OF A FLUID IN A MIXING TANK WHILE REDUCING NOISE

BACKGROUND

The present invention relates, in general, to measuring fluid, and more particularly to estimating the height or quantity of a fluid in a mixing tank while reducing noise due to internal and external forces. More specifically, the invention relates to methods and systems for estimating in real time the height and volume of a fluid contained in a mixing tank.

There exist several methods of measuring quantity or height of a fluid in a mixing tank such as a metering rod or gauge. But these traditional methods are inherently inaccurate due to measurement inaccuracies, precision errors, and achievable resolution.

The use of tank fluid height sensing in a mixing process is important in controlling the mixing capacity and preventing the system from overflowing. Most of the current measuring systems use devices such as height sensors to obtain direct measurement of the height or quantity of a fluid in a mixing tank. Height sensors inherently capture the effects of noise in the system as well as noise created by the sensor itself. In order to obtain the most accurate measurement of the height or quantity of fluid in the mixing tank, it is advantageous to remove the effects of this noise.

In situations where the tank is in motion, such as those found in a ship based mixing system, it is also advantageous to remove the height oscillations in the measurements. Some existing systems mitigate the mixing level oscillations and the sensor noises by employing two or more sensors and computing the average of the measurements in the hopes of removing the measurement errors.

It is apparent from the foregoing that a reliable method and an appropriate implementing apparatus are needed. Such method and apparatus are expected not only to perform the measurements but also to derive with more accuracy from these measurements an estimation of the quantity or the height of a fluid placed in a mixing container to avoid having the mixing container overfilled.

Moreover, changes in the quantity or the height of the fluid needs to be monitored in real time with more precision especially when the fluid properties are also subject to internal forces such as inertial and pressure forces.

Therefore, there is a need to develop improved method and apparatus for measuring and estimating the quantity or the height of a fluid in a mixing tank that is affected not only by external but also by internal forces. The estimation or control of such measurements should remove the effects of inherent height sensor noise as well as noise in the system created by internal and external forces that could affect the readings of the height of the mixing fluid.

SUMMARY

The present invention relates, in general, to measuring fluid, and more particularly to estimating the height or quantity of a fluid in a mixing tank while reducing noise due to internal and external forces.

In accordance with an aspect of the invention, a system for estimating a nominal height of a fluid in a mixing tank having one or more input rates and one or more output rates comprises a dynamic control device which compares a feedback estimated height of the fluid in the mixing tank with a measured height to obtain an estimation of a height error. The height error is iteratively recomputed by successively comparing the feedback estimated height of the fluid in the mixing tank with the measured height to drive the estimated height to a nominal height of the fluid in the mixing tank.

In accordance with another aspect of the invention, the system is used for estimating a nominal volume of a fluid in a mixing tank, regardless of the cross sectional area of the mixing tank.

In accordance with another embodiment of the invention, a system for estimating nominal fluid heights in a series of two mixing tanks having one or more input rates into the first tank, an intermediate flow rate from the first mixing tank into the second mixing tank, and one or more output rates out of the second tank. This system comprises a dynamic control device with a feedback estimated height of the fluid in the second mixing tank and a measured height of the fluid in the second mixing tank. The system further comprises a dynamic model device including an estimating function of the intermediate flow from the first mixing tank into the second mixing tank.

In accordance with another aspect of the invention, the system is used for estimating nominal volumes of fluid in a series of two mixing tanks, regardless of the cross sectional area of each mixing tank.

It is further contemplated by an aspect of the invention to provide a method of estimating a nominal height of a fluid in a mixing tank having one or more input rates and one or more output rates. The method includes the steps of measuring the height of the fluid in the mixing tank, estimating the height of the fluid in the mixing tank based on the input and output rates and an estimated model of the mixing tank dynamics, negatively feeding back the estimated height to compare with the measured height to obtain an estimation of a height error, and feeding the height error into a dynamic control device to iteratively recompute the height error to drive the estimated height of the fluid in the mixing tank to a nominal height.

It is also contemplated by another aspect of the invention to provide a method for estimating nominal fluid heights in a series of two mixing tanks having one or more input rates into the first tank, an intermediate flow rate from the first mixing tank into the second mixing tank, and one or more output rates out of the second mixing tank. The method includes the steps of measuring the height of the fluid in the second mixing tank, estimating the height of the fluid in the second mixing tank using the one or more input rates, the one or more output rates, a dynamic model device governing intermediate flow rate from the first mixing tank into the second mixing tank, and an estimated model of the two mixing tank in series system dynamics. The estimated height of the fluid in the second mixing tank is negatively fed back to compare with the measured height of the fluid in the second mixing tank to obtain an estimation of a height error. The estimated height error is fed into a dynamic control device to iteratively recompute the height error to drive the estimated height of the fluid in the second mixing tank to a nominal height. This also has the effect of driving the estimated height of the fluid in the first tank to a nominal height.

Other aspects and features of the invention will become apparent from consideration of the following detailed description taken in conjunction with the accompanying drawings.

BRIEF DESCRIPTION OF THE DRAWINGS

A more complete understanding of the present disclosure and advantages thereof may be acquired by referring to the following description taken in conjunction with the accompanying drawings wherein:

FIGS. 7A and 7B illustrate two examples of embodiment of a system with two tanks in series.

Figure 1:
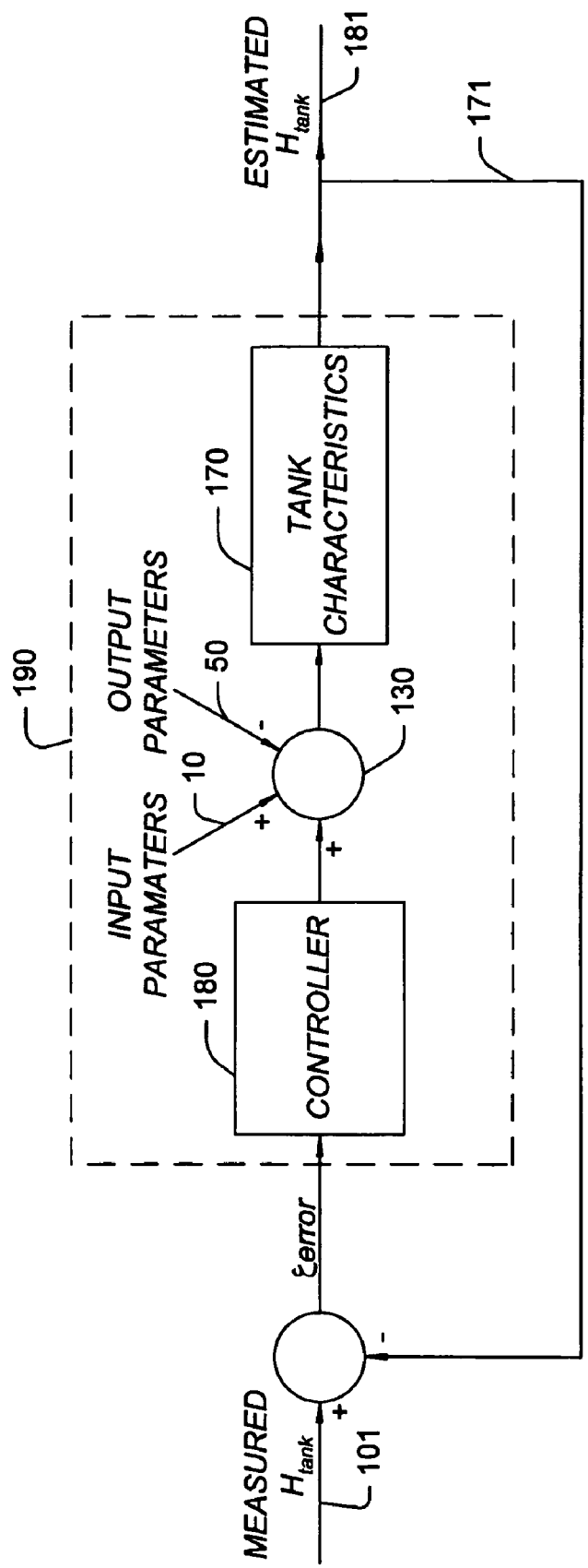
FIG. 1 illustrates an overview of a block diagram of a system for estimating the height of a mixing tank.

The present invention may be susceptible to various modifications and alternative forms. Specific embodiments of the present invention are shown by way of example in the drawings and are described herein in detail. It should be understood, however, that the description set forth herein of specific embodiments is not intended to limit the present invention to the particular forms disclosed. Rather, all modifications, alternatives and equivalents falling within the spirit and scope of the invention as defined by the appended claims are intended to be covered.

DETAILED DESCRIPTION

Existing methods of measuring the quantity of fluid in a mixing tank are affected by characteristics of the fluid. For varying types of non-contact methods, foams, vapors, fluid color, fluid density, and surface turbulence can cause a sensor to be inaccurate and to (potentially) measure with more than 10% error. For contact methods such as those involving floats, measurements are affected by gumming, particle bridging, and/or friction caused by fluid forces on the float. The float systems are vulnerable to errors due to fouling of the electronic or electric components induced by the necessity to operate the sensing element in direct contact with the fluid held in the mixing tank. These errors in the measurement of the quantity of fluid can cause the system to become inoperative or to change its calibration over time. Therefore, contact and non-contact methods can be inaccurate and cannot be implemented as such in some applications, unless they are used with a system that can correct the errors by combining the height measured in the mixing tank with a correction factor obtained from a dynamic control system.

Also known in the prior art are various forms of pressure sensing methods. These methods are affected not only by the density of the fluid but also by internal pressure forces. As the temperature changes within the mixing tank, significant pressures can build up and cause the mixing tank, the fluid, and the measurement devices to expand if they are not restrained. Additional structure is needed on the measurement devices to prevent this expansion. This additional structure naturally adds to the cost of the system of measurement. Therefore, for height sensing applications where the density of the measure fluid varies or where internal forces are present, the pressure methods used alone may not be accurate enough and should be combined with a dynamic control system that can correct error and give a more accurate estimation of the height or quantity of the mixing tank.

In addition to internal pressure forces, the fluid contained in a mixing tank can also be subjected to external forces, e.g. motion of the mixing tank. These external forces tend to create perturbations which are added to the effects of sensor noise and therefore could affect the accuracy of the height measurements.

The present invention provides a system wherein the available sensors are used in order to give an optimal estimation of the volume or the height of the fluid contained in a mixing tank. Accordingly, an external system observer is used for controlling the estimation of the mixing tank height.

The mixing tank has input volumetric rates which are measured or known along with output volumetric rates. A dynamic control system is implemented to obtain an estimated height of the mixing tank in real time. First, this estimate of the height is compared to the measured height of the mixing tank to obtain an estimation of the height error. Then this height error is used to drive the height estimation to a nominal height of the mixing tank through the use of a Proportional Integral type controller, also referred to as a PI controller. By setting the PI gains, the noise and oscillations of the mixing tank can be removed from the height estimation while tracking the nominal value of the height.

The apparatus and methods according to the present invention enable the removal of the effects of noise and poor sensor performance due to environmental effects such as cement dust in the air or tank oscillations from the height readings.

Referring now to the drawings wherein like reference numerals refer to the same or similar elements, FIG. 1 is a block diagram which illustrates that an estimated height 181 of a tank is obtained by processing the value of a measured tank height 101 with one or more input parameters 10 and one or more output parameters 50 of the tank system. More specifically, FIG. 1 shows a tank height filter where a plurality of sensors are used to obtain such input and output parameters. These input and output parameters are then fed as data into a dynamic model of the mixing tank such as an observer which combines them with the tank characteristics in order to generate an estimation of the height of the mixing tank.

The dynamic model is based on a control system 190 that includes a controller 180 with a control function, one or more feed forward input parameters 10, one or more feed forward output parameters 50, a summation block 130, and a tank characteristics function 170. The summation block 130 is positively fed with the input parameters 10 and with the output of the controller 180, and is negatively fed with the output parameters 50. The tank characteristic function 170 takes into account the dimensions of the tank such as its cross section area and the partition or separation of the tank into subdivision as is shown in FIG. 7B. By addition of a feed forward function to the dynamic model, the performance is improved, especially when the feed forward is used together with a traditional feedback function, the overall dynamic system can outperform more traditional controller functions that contain a simple PI controller. Since all the sensors have inaccuracies and noise, a control loop 171 is closed around the measured and estimated tank height.

Figure 2:
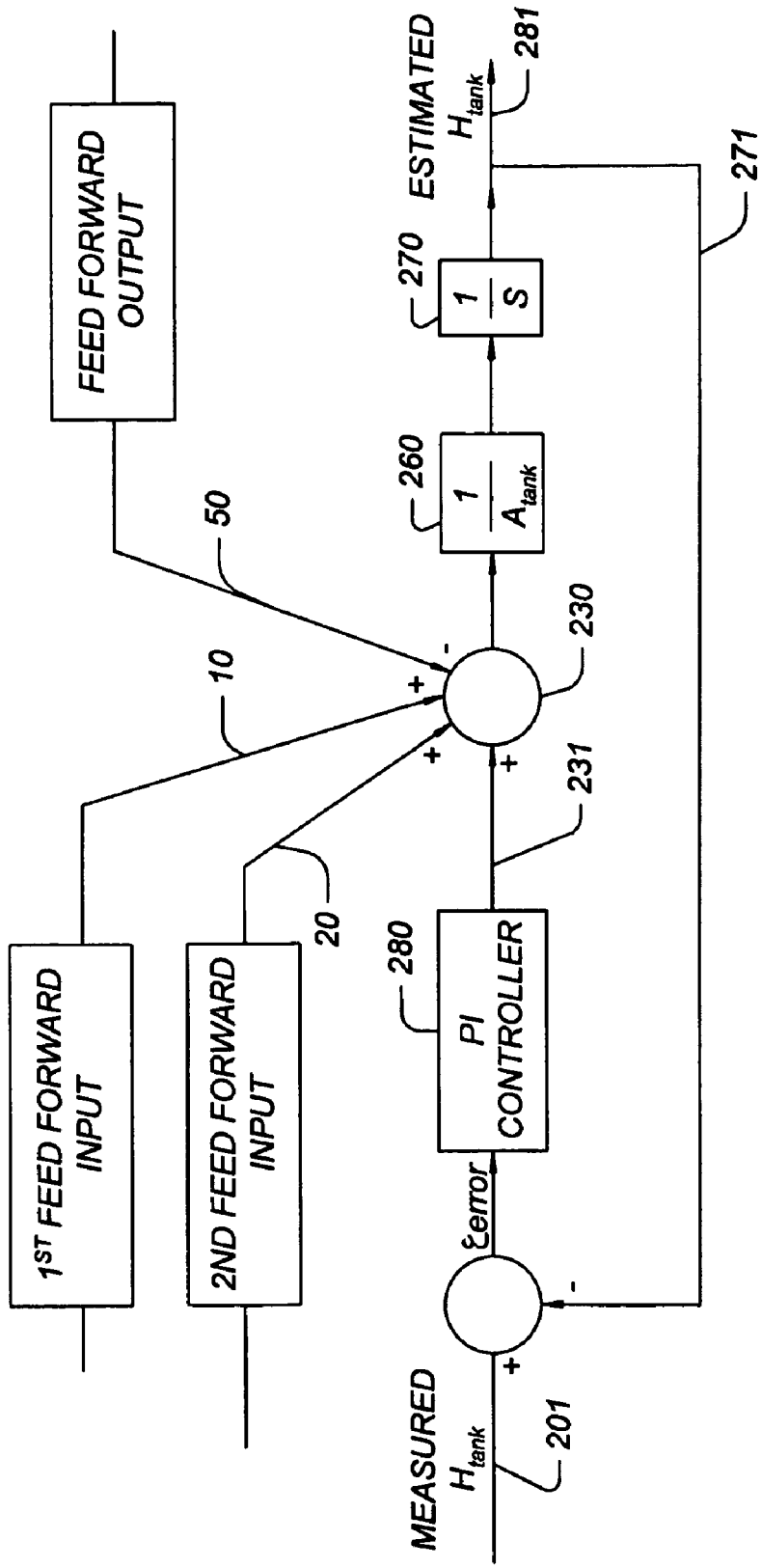
FIG. 2 illustrates a schematic embodiment of a system for estimating the height of a mixing tank.

In another embodiment as illustrated in FIG. 2, the function of the dynamic model, which is to remove noise and effects in the height reading in order to obtain more accurate height information, is shown with more detail. In this respect, a PI controller 280 performs the function of the controller. Additionally, input volumetric rates and output volumetric rates are used as feed forward into the dynamic model. For example, a first feed forward input 10 and a second feed forward input 20 are added whereas a feed forward output 50 is subtracted from the dynamic model. The dynamic system might contain additional feed forward inputs or outputs. The summation by summation block 230 of positive feed forward inputs 10, 20 and negative feed forward output 50, and the output 231 of the PI controller 280 is used to drive the estimation of the tank height to a nominal tank height. In these conditions, the present dynamic system will operate as an ideal system with a correct initial condition so as to return a correct estimate of the tank height.

The sensors inaccuracies and noise requires the use of a control loop 271 around the measured tank height 201 and estimated tank height 281. By setting gains in the PI controller 280, the band pass can be set. An advantage of this filter compared to other filters is that it observes the state at the current time without lagging it.

Also, it should be noted that the tank cross sectional area does not need to be a constant, this system is unaffected by changes in the cross sectional area as long as those changes are known a priori.

Block 260 represents the inverse of the tank cross-sectional area to convert the rate of change of fluid volume in the tank to rate of change of fluid height in the tank. Block 270 represents an integration process with respect to time converting the rate of change of fluid height in the tank to the estimated fluid height.

Figure 3:
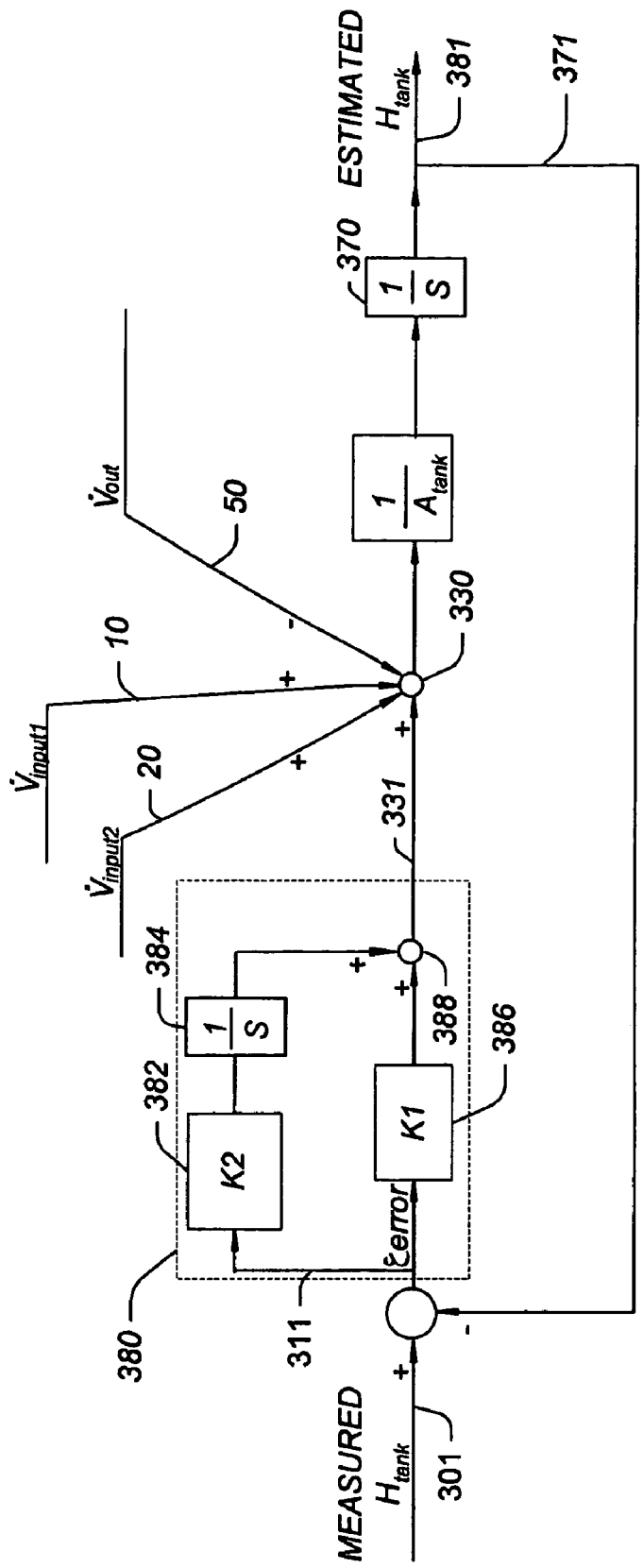
FIG. 3 illustrates one embodiment of a system for estimating the height of a mixing tank.

In another embodiment as illustrated in FIG. 3, a traditional PI controller 380 is used in the dynamic model with constant gains $K_p$ and $K_i$ for the proportional component 386 and integral component 382 associated with an integration factor 384.

The input 311 to the PI controller 380 is an error function $\epsilon_{error}$, also referred to as e(t). The error function is calculated as the difference between a measured variable and an estimated variable. In the present case, the measured variable is the measured tank height, referred as Measured $H_{tank}$ 301, and the estimated variable is the estimated tank height, referred as Estimated $H_{tank}$ 381.

In another embodiment, the variables can be other physical parameters such as the volume, quantity of fluid, area etc.

The temporal response to a PI controller may be given by the following equation:

$$u(t) = K_p e(t) + K_i \int e(t) dt,$$

wherein e(t) is the error function.

The temporal response of a PI controller may also be transformed into the frequency domain through the use of a Laplace transform. The Laplace transform of the temporal response of a PI controller may be given by the following equation:

$$U(s) = \left(K_p + \frac{K_i}{s}\right) E(s),$$

wherein $K_i$=K2 and $K_p$=K1 in the present case.

One skilled in the art with the benefit of this disclosure will recognize that the methods, devices, and systems of the present invention may be applied to digital signals, as well as analog signals. The digital signals may be processed using digital transform functions, including, but not limited to, Z transforms, Fast Fourier transforms, wavelet transforms.

As shown in FIG. 3, input volumetric rates of a first feed forward input $\dot{V}_{inputs1}$ 10 and a second feed forward input $\dot{V}_{inputs2}$ 20 are known along with output volumetric rate of a feed forward output $\dot{V}_{outputs}$ 50. This method is applied to a model of the system dynamics to obtain an estimated height of the tank based on a value of a measured height of the tank. This estimate of the height is then compared to the measured tank height to obtain an estimation of the height error. This height error is used to drive the estimation to the nominal tank height through the use of the PI controller 380. By setting the PI gains K1 and K2 of the proportional and the integral components, referred as 386 and 382 in FIG. 3, the noise and oscillations of the tank can be removed from the tank estimation while tracking the nominal value of the tank height.

The sensors inaccuracies and noise requires the use of a control loop or a feedback loop 371 around the measured tank height 301 and the estimated tank height 381. By setting gains in the PI controller 380, the band pass can be set. In this way, the filter with the addition of the feed forward inputs 10 and 20 and feed forward outputs 50 will observe the state at the current time without lagging it. A summation block 330 is positively fed by the feed forward inputs 10 and 20 and output 331 of the PI controller 380 provided by summation block 388. The summation block 330 is also negatively fed by the feed forward outputs 50.

The output of the summation block 330 is then fed into an integration process using a discrete Euler forward integration method with a sampling time. The integration is represented by a cross sectional area factor which corresponds to a division by the cross sectional area of the tank ($1/A_{tank}$) and by an integration factor 370.

It should be noted that the tank cross sectional area does not need to be a constant. These methods and systems are not affected by changes in the cross sectional area of the tank as long as those changes are known a priori.

For the purpose of further illustration of the invention, graphic results of the simulation are shown in the following FIGS. 4 and 5.

Figure 4:
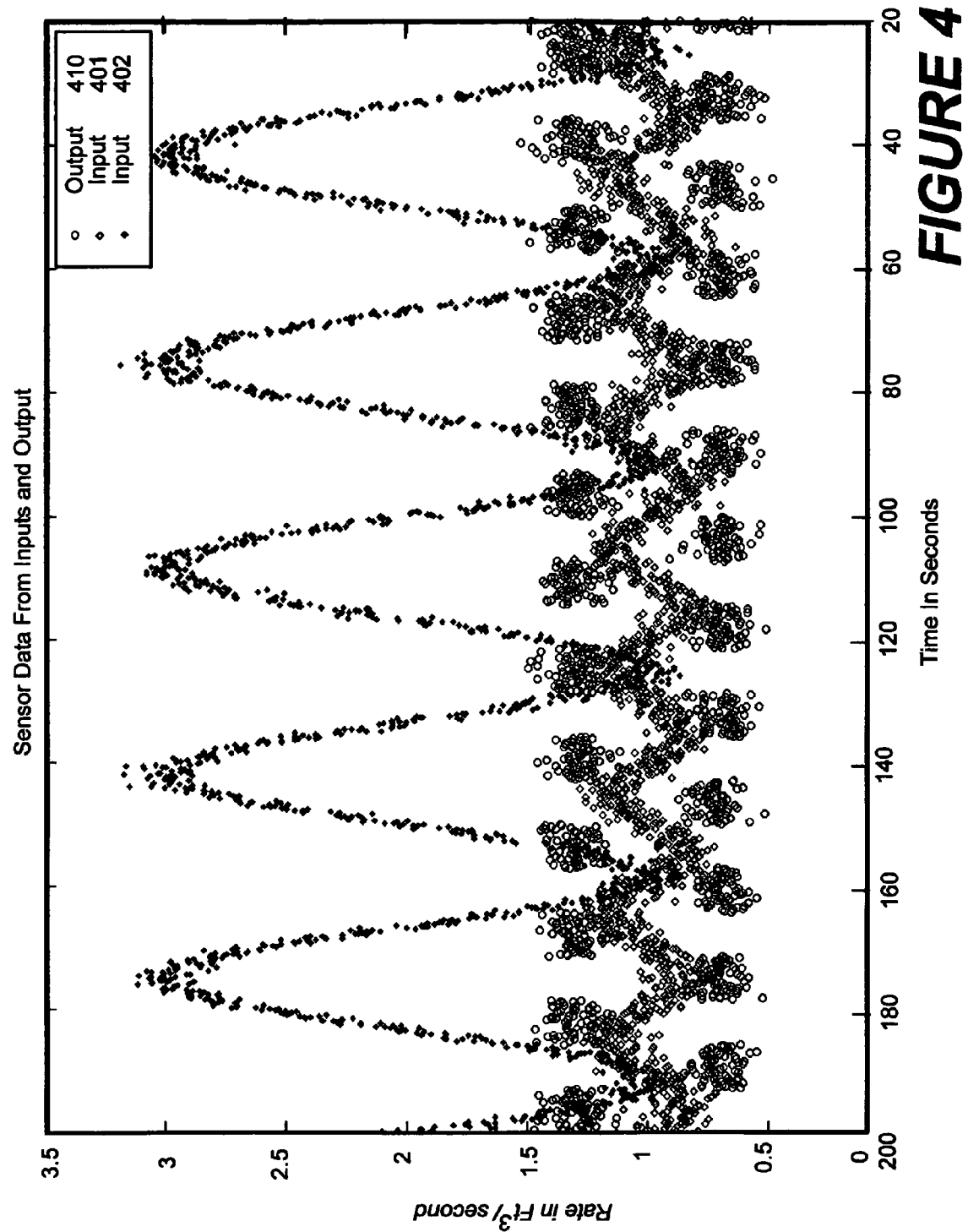
FIG. 4 shows a simulation of the system having two input volumetric rates and one output volumetric rate.

In FIG. 4, a simulation of the system as shown in FIG. 3 was run using a mixing tank with a cross sectional area of 12 square ft and an initial height of 5 ft. The two feed forward inputs 10 and 20 of FIG. 3 are respectively graphically represented by curves 401 and 402. In the same way feed forward output 50 is graphically represented by curve 410. In the simulation, the integration process represented by integration factor 370 in FIG. 3 is implemented using a discrete Euler forward integration method with a sampling time of 1/10 seconds. The gains K1 and K2 were set to 0.2 and 0.4 respectively. As is shown in FIG. 4, there is a significant amount of noise, on the order of 10%-30%. However important they are, these noises will not affect the result obtained with the dynamic control system of the present invention.

Figure 5:
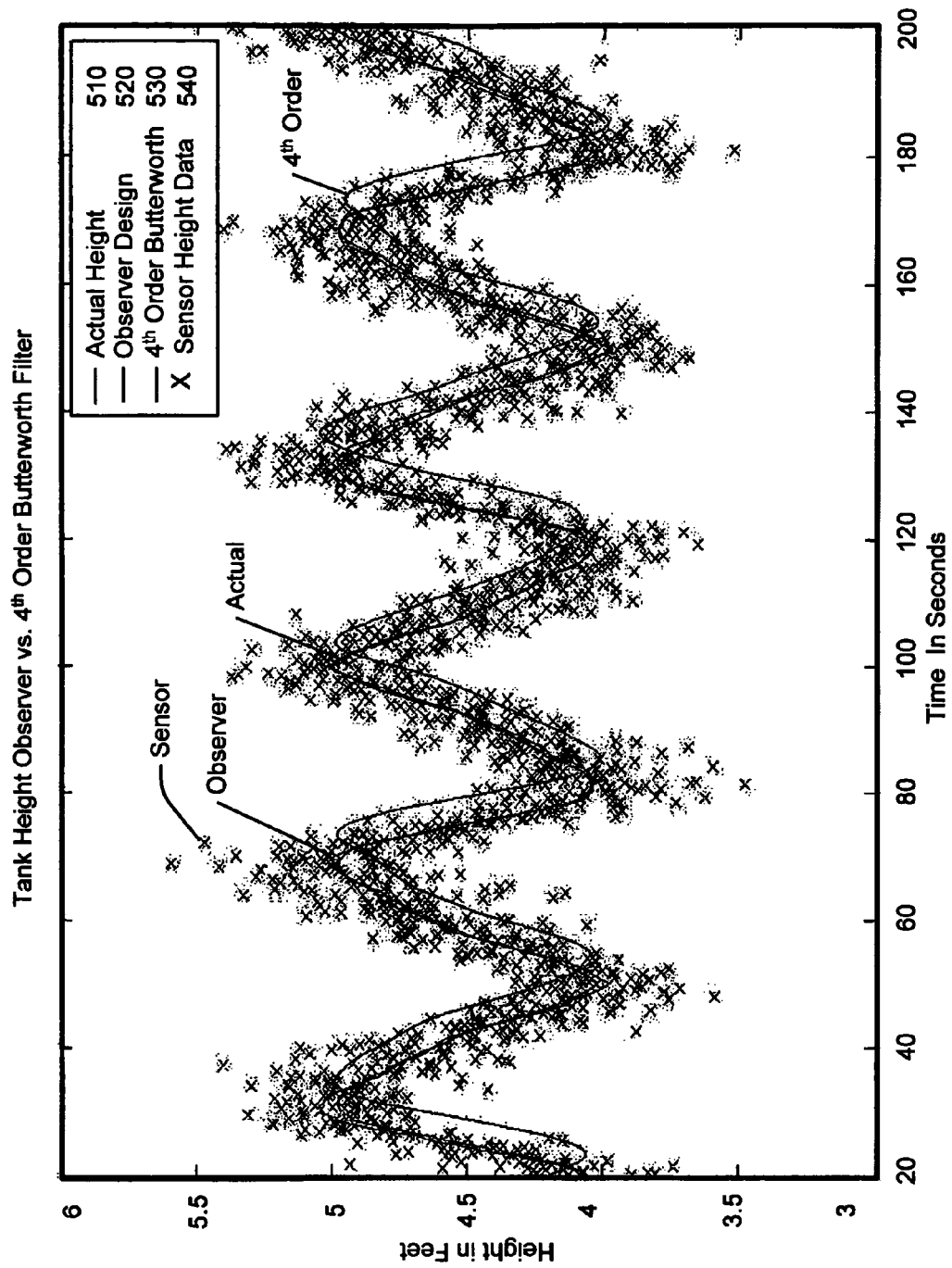
FIG. 5 shows a comparison of the results obtained with the simulation with a Butterworth filter and a single height data sensor.

FIG. 5 shows the difference between a graph of actual height 510, a graph of estimated height 520 with the observer using the present dynamic control system, a graph of a $4^{th}$ order Butterworth filter 530, and a graph of a sensor height measurement 540. The $4^{th}$ order Butterworth filter 530 is a traditional filter that is commonly used for estimating the tank height. The sensor height measurement 540 shows that the data are scattered with a significant percentage of error as is expected.

As is previously mentioned, the method that consists in using a plurality of sensors to measure the height of a mixing tank and taking the average of the measurements cannot be used in the present case. The addition of the percentage error of each sensor might result in an average height with more than 100% error. The average method is thus not reliable without a dynamic control system as implemented according to the present invention.

FIG. 5 shows how close the actual height 510 and estimated height 520 obtained with the dynamic control system according to the present invention. Even though the sensor height measurement 540 data as shown embeds about 10% error in it, the dynamic control system can still track the actual height 510 while removing the noise and not lagging the signal. On the contrary, the $4^{th}$ order Butterworth filter 530 lags the actual value by about 5 seconds. Using either the $4^{th}$ order Butterworth filter 530 or a plurality of sensors would have made the estimation of the tank height difficult considering the lag in the response time.

From the graphs shown in FIG. 5, it is clear that the estimated height 520 obtained with the height observer using the dynamic control system outperformed the result of the traditional filter such as the $4^{th}$ order Butterworth filter 530 and the measurements obtained by the use of a single sensor 540 or a plurality of sensors.

A similar simulation is run for a tank having a cross sectional area with a linear function of the height ($A_{tank}$=constant1+constant2*height) and a nonlinear function of the height ($A_{tank}$=constant1+constant2*height^2) and the results were similar to those with a constant cross section at a sampling rate of 0.1 seconds. In a particular embodiment, the simulation uses a tank cross sectional area with a linear function of the height ($A_{tank}$=8+0.3*height) and a nonlinear function of the height ($A_{tank}$=8+0.3*height^2) and the results is similar to those with a constant cross section at a sampling rate of 0.1 seconds.

Figure 6:
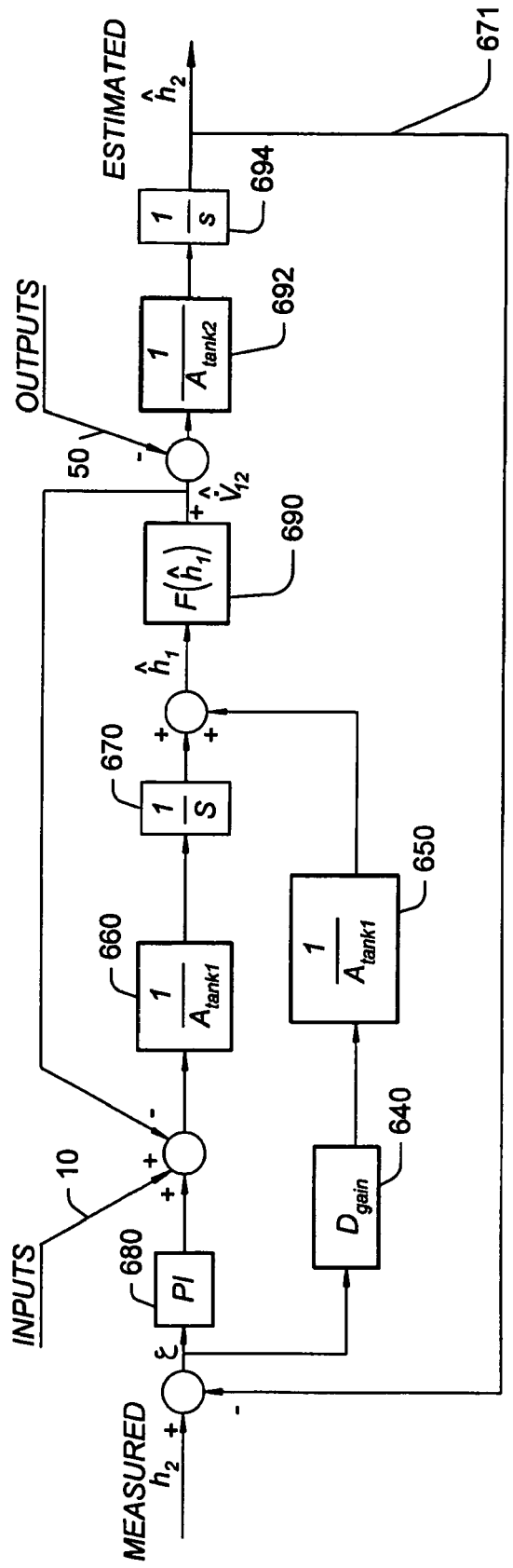
FIG. 6 shows a block diagram with two mixing tanks in series wherein the mixing tank system consists of measured input volumetric rates in the first tank and measured output volumetric rate of the second tank.

FIG. 6 is a block diagram which represents a method for estimating the heights and/or volumes of a fluid associated with two mixing tanks in series referred to as tank 1 and tank 2. The mixing tank system consists of measured input volumetric rates into the first tank and measured output volumetric rates of the second tank. A device exists between the first tank and second tank which meters the output of the tank 1 directly into tank 2. This device could be a weir/partition or some other form of fluid channeling mechanism. The embodiment shown in FIG. 6 assumes a weir/partition in which the flow rate out of mixing tank 1 into mixing tank 2 is a function of the fluid height in mixing tank 1. The device dependent function, known a priori, describing the relationship between fluid height and volumetric flow rate is given as:

$$\dot{V}_{12}=F(\hat{h}_1);$$

wherein $\dot{V}_{12}$ is the estimated volumetric flow rate between the first tank and second tank and $\hat{h}_1$ is the estimated height of fluid in the first tank.

Similar to the single tank method described earlier, a dynamic control system is implemented in which the measured fluid height of tank 2 is compared to the current estimated fluid height of tank 2 to obtain an estimation of the fluid height error. This error is used to drive the tank 2 fluid height estimation to a nominal fluid height value through the use of a Proportional Integral Derivative type controller, also referred to as a PID controller. By setting the PID gains, the noise and oscillations of the mixing tank system can be removed from the tank 2 fluid height measurement while tracking the nominal values of both the tank 1 and tank 2 fluid heights.

Referring to FIG. 6, the current measured value of the fluid height in tank 2 is compared to the last value of the estimated fluid height in tank 2 through the use of a feedback loop 671. The error between these two signals is fed through a proportional gain, $K_1$, and an integral gain, $K_2$ ($K_1$ and $K_2$ are not shown in FIG. 6 but can be referred to as PI controller 680). The sum of the measured volumetric input flow rates into tank 1, referred as $\Sigma\dot{V}_{inputs}$ 10, are added to the filtered error signal coming from the proportional and integral calculations in PI controller 680. This combined signal is then fed through a dynamic model of the first tank referred to as a cross-sectional area factor 660 and an integration factor 670. The cross sectional area factor 660 and the integration factor 670, respectively, correspond to the coefficient $1/\hat{A}_1$ representing the inverse of the cross-sectional area of tank 1 and the coefficient 1/s representing the integration of the fed through signal. The resulting signal $\hat{h}_1$ is the estimation of the fluid height in tank 1. The addition of a derivative control is possible without direct signal differentiation by passing the tank 2 height error through a derivative gain, referred to as 640 and 650, which respectively corresponds to $D_{gain}$ or $K_3$ and the coefficient $1/\hat{A}_1$, and by feeding this signal past the integration coefficient 1/s as shown. This allows for implementation of a PID controller improving filtering and tracking characteristics for the fluid height estimation algorithm of a two tank mixing system.

The estimated fluid height in tank 1 is fed through a flow rate function device 690 to obtain an estimation of the volumetric flow rate $\dot{V}_{12}$ of fluid from tank 1 into tank 2. Additionally, the value of $\dot{V}_{12}$ is fed back negatively into the tank 1 dynamic model to represent the loss of fluid from tank 1. The sum of the measured volumetric output flow rates from tank 2, referred as $\Sigma\dot{V}_{outputs}$ 50, are negatively combined with the estimated volumetric flow rate into tank 2 from tank 1. This combined signal 50 is then fed through a dynamic model of the second tank, referred as 692 and 694, which respectively includes the coefficient $1/\hat{A}_2$ representing the inverse of the cross-sectional area of tank 2 and the coefficient 1/s representing the integration of the fed through signal. The resulting signal $\hat{h}_2$ is the estimation of the fluid height in tank 2.

As in the single tank system the use of the PID controller allows noise and oscillations of the tank system to be removed from the estimation of the tank fluid heights while tracking the nominal values of fluid height in each tank. The use of the known feed forward input and output volumetric rates with the volumetric flow rate function device allows both of the tank fluid heights to be observed at the current time without lagging. Additionally, the cross-sectional area of each tank does not need to be constant but known a priori. Through the use of the volumetric flow rate function device, the fluid heights in both tanks can be estimated and tracked without any additional sensors relative to a single tank system with the same measured inputs and outputs.

FIGS. 7A and 7B illustrate two examples of an embodiment of a system with two tanks that are in cascade. Example 1 of FIG. 7A shows a first tank 710 containing a fluid whose height is referred as $h_1$. The first tank has an inlet referred as inputs. Its output is constricted as through a valve 712 with a flow rate that is a function of the height $h_1$ for a fixed valve position where $\dot{V}_{12}=F(h_1)$. Thus, the first tank 710 is defined by three variables: inputs, heights, and flow rate.

A second tank 720 receives the fluid from the first tank 710. The height of the fluid in the second tank 720 is referred as $h_2$, and its outlet is referred as outputs.

Example 2 of FIG. 7B shows a single tank 750 with a weir or partition that separates the tank 750 into an upstream portion and downstream portion. The upstream and downstream portions respectively contain the fluid at heights referred as $h_1$ and $h_2$. The upstream portion receives the fluid from the inlet of the tank 750 referred to as inputs whereas the outlet of the tank 750 is the outlet of downstream and is referred as outputs. The weir or partition affects the flow of the fluid between the two portions of the tank 750 such that $\dot{V}_{12}=F(h_1)$.

FIGS. 7A and 7B show two possible embodiments of a two tank system. There are other possible embodiments that can be simulated with the block diagram and the control functions as shown in FIG. 6.

The dynamic control system as shown in the previous figures can be implemented on any mixing tank system where height measurement is periodically or frequently needed. If the height sensor experiences signal degradation or if the mixing tank oscillates, this dynamic control system can still give more precise readings of the height by removing these noise effects.

By implementing a dynamic control system according to the present invention on a mixing tank, this latter can be used for instance, on ship mounted systems, on systems where the sensor information is imprecise either from environmental or sensor imperfections, or on any other systems where the tank height readings need to be improved by using an approach combining an estimation and a correction of the measured height.

The apparatus and method according to the present invention can be used on ship mounted systems where units are blended and where wave action causes tank level oscillations and therefore significant noise for the height measurement.

The apparatus and method according to the present invention, can be used on cement mixing systems where sensor information can be degraded due to environmental effects.

The invention, therefore, is well adapted to carry out the objects and to attain the ends and advantages mentioned, as well as others inherent therein. While the invention has been depicted, described and is defined by reference to exemplary embodiments of the invention, such references do not imply a limitation on the invention, and no such limitation is to be inferred. The invention is capable of considerable modification, alternation and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A system for estimating nominal fluid heights in a series of two mixing tanks having one or more input rates into the first tank, an intermediate flow rate from the first mixing tank into the second mixing tank, and one or more output rates out of the second tank, the system comprising:

a dynamic control device with a feedback estimated height of the fluid in the second mixing tank and a measured height of the fluid in the second mixing tank, wherein the dynamic control device compares the feedback estimated height of the fluid in the second mixing tank with the measured height of the fluid in the second mixing tank to obtain an estimation of a height error, the height error being iteratively recomputed and used in conjunction with the one or more input and output rates to drive the estimated fluid heights in both the first mixing tank and second mixing tank to nominal fluid height values;

a dynamic model device of the two mixing tanks including an estimating function of the intermediate flow rate from the first mixing tank into the second mixing tank; and a derivative control component comprising a positive feed derivative control loop, wherein the positive feed derivative control loop includes a derivative gain receiving the height error and feeding a height error signal into the dynamic model device for estimation of an estimated height of the fluid in the first mixing tank.

2. The system of claim 1 wherein the dynamic control device further comprises a proportional integral PI controller responsive to the height error of the fluid in the second mixing tank.

3. The system of claim 2 wherein gains of the PI controller are set to get the optimal track of the nominal height of the fluid in second mixing tank.

4. The system of claim 1 wherein the one or more input and output rates are respectively converted into height rates before being integrated with respect to time to obtain the estimated fluid heights in the first and second mixing tanks.

5. The system of claim 4 wherein:

the one or more input and output rates are volumetric rates;

the one or more input rates are added to an output of a PI controller before being divided by a cross sectional area of the first section of the mixing tank and integrated with respect to time then added to an output of the derivative control component to obtain the estimated height of the fluid in the first mixing tank; and the one or more output rates are subtracted from the output of the estimating function of the intermediate flow rate in the dynamic model device before being divided by a cross sectional area of the second mixing tank and integrated with respect to time to obtain the estimated height of the fluid in the second mixing tank.

6. The system of claim 5 wherein the output of the estimating function of the intermediate flow rate is negatively fed back into the output of the PI controller.

7. The system of claim 2 wherein the fluid is a liquid, a gas, a combination thereof, or contains desirable additives that modify its internal physical properties.

8. The system of claim 1 wherein the cross sectional area of each mixing tank is constant and/or variable.

9. The system of claim 1 to be used for estimating a nominal volume or nominal quantity of the fluid in the first and second mixing tanks.

\* \* \* \* \*